United States Patent [19]

Park et al.

[11] Patent Number: 4,630,473
[45] Date of Patent: Dec. 23, 1986

[54] VERSATILE FORCE MEASURING SYSTEM

[75] Inventors: Kyong Park, Chatsworth; Goran S. Alwerud, Granada Hills, both of Calif.

[73] Assignee: Kavlico Corporation, Chatsworth, Calif.

[21] Appl. No.: 708,088

[22] Filed: Mar. 5, 1985

[51] Int. Cl.$^4$ .......................... G01L 5/00; G01N 3/20
[52] U.S. Cl. ........................ 73/161; 73/849; 73/862.64
[58] Field of Search ............... 73/161, 849, 862.54, 73/862.64, 724, 789, 812

[56] References Cited

U.S. PATENT DOCUMENTS

| | | | |
|---|---|---|---|
| 2,442,713 | 6/1948 | Shartle | 73/849 |
| 2,573,488 | 10/1951 | Raetsch et al. | 73/161 |
| 3,276,579 | 10/1966 | Dluzen et al. | 73/161 X |
| 3,392,576 | 7/1968 | Hollander, Jr. | 73/862.68 |
| 3,528,295 | 9/1970 | Johnson et al. | 73/862.54 |
| 3,646,810 | 3/1972 | Taysom et al. | 73/161 |
| 4,168,518 | 9/1979 | Lee | 73/862.64 X |
| 4,177,496 | 12/1979 | Bell et al. | 73/724 X |

FOREIGN PATENT DOCUMENTS

2062168 5/1981 United Kingdom .............. 73/161

*Primary Examiner*—Charles A. Ruehl
*Attorney, Agent, or Firm*—Poms, Smith, Lande & Rose

[57] ABSTRACT

A force measuring system for measuring the deflection force of spring-mounted magnetic reading and writing heads, and other parts, includes a capacitive type pressure transducer, of the type having two spaced insulating plates wherein at least one of the plates is a flexible diaphragm; a standardized pivoted force transmitting arm having one rounded end thereof engaging the center of said flexible diaphragm; a movable carriage for holding the magnetic head or other part to be tested under predetermined levels of deflection; guide plate arrangements for controlling the movement of the carriage so that the magnetic head or other part is brought into engagement with the end of the force transmitting arm; micrometer arrangements for providing a controlled amount of deflection of the reading head assembly or other part when the magnetic head engages the force transmitting arm; and measuring and display arrangements for indicating the force applied to the diaphragm at the predetermined level of deflection. The carriage is arranged for both horizontal and vertical movement under control of the guide, and with a dashpot for avoiding undue stress on the diaphragm.

19 Claims, 14 Drawing Figures

VERSATILE FORCE MEASURING SYSTEM

FIELD OF THE INVENTION

This invention relates to electronic force measuring systems.

BACKGROUND OF THE INVENTION

In computer storage systems it is customary to provide high density storage on rigid magnetic disks; and the information on the disks is read and recorded by means of magnetic heads which are normally spring-biased toward the rigid magnetic disks. As the high velocities at which the disks rotate, the circulating air acts against the spring pressure urging the magnetic heads toward the disk, and there is a predetermined spacing or flying height of the magnetic heads above the surface of the disks. For proper operation of the computer storage systems, it is most important that the spacing of the magnetic heads from the disks is accurate and constant. It is therefore important that the force exerted by the springs tending to bias them toward the disks with which they are associated be at the proper level. Up to the present time, no simple arrangement for accurately measuring the spring tension has been available.

Accordingly, an important object of the present invention is to provide a system for quickly and accurately measuring the force exerted by a magnetic head, when it is deflected by a predetermined amount. A collateral object of the present invention is to provide a versatile and accurate force measuring system of general utility, but which is particularly useful in connection with parts which have predetermined levels of flexibility or deflection at which they are to be operated.

SUMMARY OF THE INVENTION

In accordance with a specific illustrative embodiment of the invention, an apparatus for determining the force exerted by a magnetic head resulting from a predetermined deflection of the spring upon which the magnetic head is mounted, includes a capacitive type pressure transducer having two spaced plates with one of the plates being a flexible diaphragm; a standardized pivoted force transmitting arm having one end engaging this center of the diaphragm, a movable carriage for holding a part to be tested under predetermined levels of deflection, clamping arrangements for mounting a part securely on the carriage, a guide for directing the magnetic head into engagement with the end of the force transmitting arm overlying the center of the diaphragm, micrometer arrangements for providing a controlled amount of deflection of the part as the magnetic head engages the force transmitting arm, and finally, arrangements for measuring and displaying the force applied to the diaphragm under the predetermined levels of deflection.

Other features and aspects of the invention include the following:

1. Both vertical and horizontal tracks are provided for the carriage.
2. A guide and mating bearing on the base and on the carriage, with the guide having both horizontal and vertical slots for receiving the bearing, whereby the carriage may be moved both horizontally and vertically but only along restricted and guided paths.
3. A rotatable mount is provided for the guide bearing to shift the physical positions of the allowed guided paths for the carriage relative to the base by a predetermined amount, to accommodate different parts to be measured.
4. A rotatable mount for the magnetic head assemblies having at least two spaced fixed positions in which measurements may be made.
5. A dashpot is provided for controlling the descent of the carriage in its guided path, relative to the base.
6. A standardized gage element may be provided for aligning the micrometer device with the surface of the end of the force transmitting arm, thereby providing a reference input by which the deflection may be determined.
7. The guide plate may have an elongated horizontal slot and vertical slots of different vertical extent to provide several measuring locations, and one location with the carriage remote from the capacitive transducer, for loading and unloading parts.

In accordance with another aspect of the invention, a capacitive pressure transducer including a flexible diaphragm is provided with a special force transmitting member having a rounded end for engaging the center of the transducer; and forces to be measured are applied to the force transmitting member rather than directly to the diaphragm. The rounded end of the force transmitting member avoids errors which might otherwise be introduced by the configuraton of various parts which might engage the diaphragm.

It is also noted that different types of pressure transducers may be employed, and that the present invention is applicable to the measurement of parts other than magnetic heads for computer purposes.

Other objects, features and advantages of the present invention will become apparent from a consideration of the following detailed description and from the accompanying drawings.

DETAILED DESCRIPTION

Figure 1:
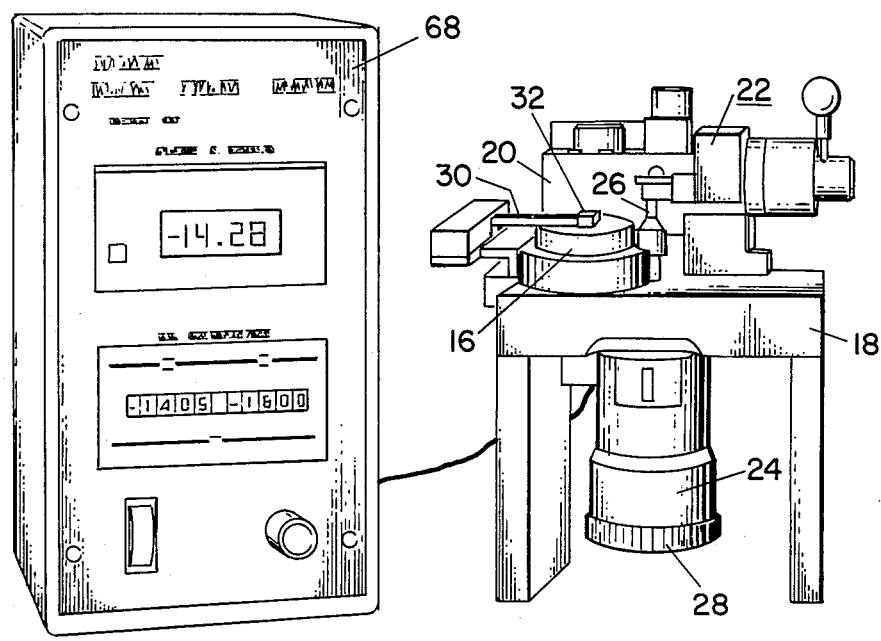
FIG. 1 is an overall view of a system illustrating the principles of the present invention.
Figure 5:
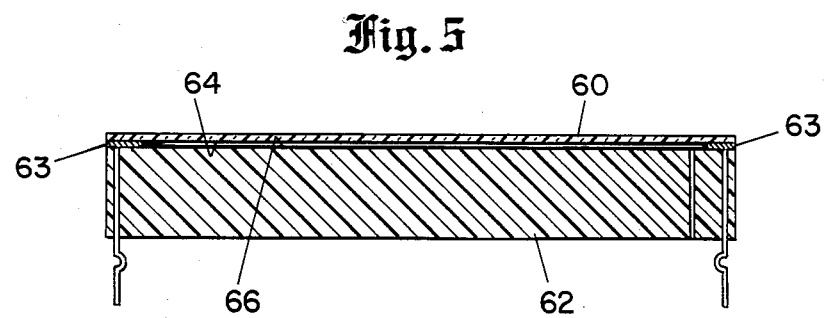
FIG. 5 is a cross-sectional view of a standard pressure measuring transducer manufactured by the assignee of the present invention.

Referring more particularly to the drawings, FIG. 1 is an overall view of a force measuring system including the digital read-out associated therewith, as will be described in greater detail in connection with the remaining figures of the drawings. Incidentally, the assignee of the present invention, Kavlico Corporation, has a number of granted patents on its pressure force transducer, as generally shown in FIG. 5 of the drawings, and on the associated electronic circuitry for converting the changes in capacitance of the transducer into a variable voltage output. The pressure transducer is included within the housing 16 shown in FIG. 1 of the drawings. Prior patents which disclose the nature of the transducer, its construction, and associated electronics, include U.S. Pat. Nos. 4,398,426, granted Aug. 16, 1983; 4,388,668, granted June 14, 1983; and 4,426,673, granted Jan. 17, 1984.

The assembly of FIG. 1 includes a base 18, a movable carriage 20 which may be moved in both the vertical and horizontal directions, and a part clamping fixture 22 mounted on the carriage 20, and rotatable by 180 degrees to spaced measuring positions.

A micrometer assembly 24 has a movable arm or plunger 26 which may be adjusted vertically by turning the micrometer handle 28. Associated with the capacitive transducer within housing 16 is a force transmitting arm 30 having an inner end 32 to which a force to be measured is applied.

Figure 2:
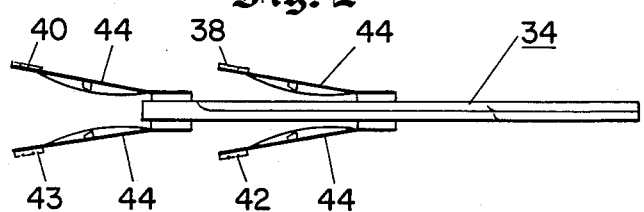
FIGS. 2 and 3 are side views of two different types of magnetic reading and writing heads which may be measured by using the principles of the present invention.
Figure 3:
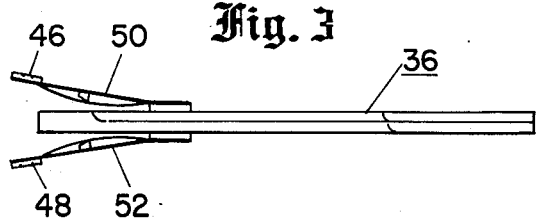

Shown in FIGS. 2 and 3 are magnetic brush assemblies 34 and 36. These magnetic head or magnetic "brush" assemblies are intended for use with magnetic memory systems employing rigid disks of magnetic material. Each of the four magnetic heads 38, 40, 42 and 43 are mounted on separate springs 44. These springs are designed to have a predetermined force which is applied to the reading heads 38 urging them outwardly from the central support member. When the rigid magnetic storage disks are rotated at high speeds, the air pressure forces the magnetic heads up away from the surface of the disks, by a predetermined "flying height" distance which depends critically on the force supplied by the associated springs 44. One important purpose of the present invention is to measure the force exerted by the springs 44 when the heads are deflected from their neutral or rest position by a predetermined amount, thereby insuring that the proper "flying height" or spacing obtains when the head assemblies are used in the magnetic storage system.

For completeness, it may be noted that the brush assembly of FIG. 3 includes only two magnetic heads 46 and 48 mounted on the springs 50 and 52, respectively, and the distance from the end of the plate 36 to the head 46 and 48 is such that they are located half-way between the heads 38 and 40 of the assembly of FIG. 2.

Figure 4:
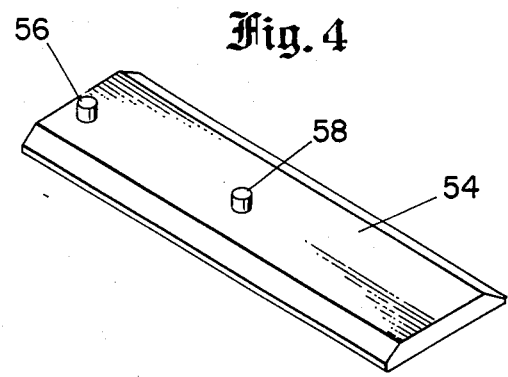
FIG. 4 is a gage which is employed in place of a part in the course of calibration of the system of FIG. 1.

FIG. 4 is a gage assembly having a base or shank portion 54 which has the same cross-sectional configuration as the right-hand ends of the brush assemblies 34 and 36 of FIGS. 2 and 3. The metal studs 56 and 58 are spaced apart by the exactly the distance between the center of the end 32 of the force transmitting arm 30, and the micrometer probe 26. Accordingly, when the gage assembly 54 is mounted in the part holder 22, and the carriage 20 is properly advanced, as discussed hereinbelow, the ground metal stud 56 will precisely overly the end of the arm, while the ground stud 58 will be precisely located over the micrometer probe 26. Then, as the micrometer piston or probe 26 is raised, a point may be determined where the outer stud 56 no longer exerts force on the end 32 of the arm 30, and this is the reference position for the micrometer. Subsequently, as will be described hereinbelow, the micrometer may be advanced by a predetermined amount to support the movable carriage and provide the desired deflection of the springs 44 or 50 associated with the magnetic heads, so that the force of the springs can be measured.

FIG. 5 shows the nature of the capacitive pressure or force transducer which is employed in connection with the illustrative embodiment of the invention. More specifically, the transducer includes two ceramic plates 60 and 62. These plates may, for example, be formed of aluminum oxide, or alumina. The upper plate 60 is relatively thin and acts like a diaphragm, flexing in and out with changes in pressure or force applied thereto. The two plates 60 and 62 may be spaced apart and sealed by glass frit 63 around the periphery of the two plates. On the facing inner surfaces of the plates 60 and 62 are conductive coatings 64 and 66. These conductive coatings form the plates of a capacitor, and as the diaphragm 60 flexes, the spacing between the conductive plates changes, thereby varying the capacitance. This variation in capacitance is sensed, and is converted into electrical signals representing the applied pressure or force, as described in some detail in the aboveidentified U.S. patents. The resultant voltage is converted into pressure or force units, and is displayed on the commercially available display unit 68 as shown in FIG. 1.

The movable carriage 20 as shown in FIG. 1 is movable both in the horizontal and in the vertical directions. A guide plate 70, shown by itself in FIG. 6, and as part of the carriage assembly in FIG. 7, controls the movement of the carriage 20 in the horizontal and vertical directions. This is accomplished, with reference to FIG. 7, by the interfitting guide plate 70 and the bearing assembly 72 mounted on the bearing support bracket 74, which is in turn rigidly secured to the base 18.

Figure 7:
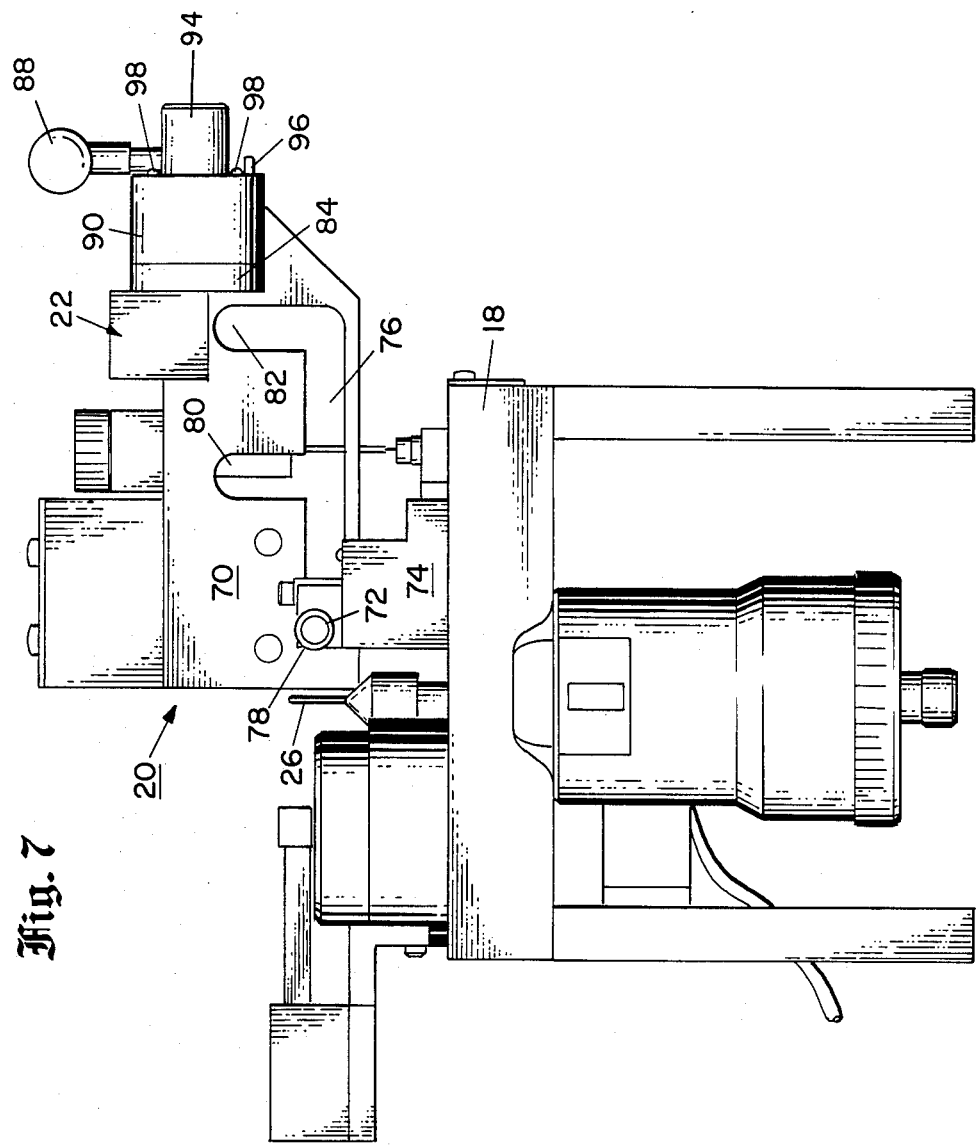
FIG. 7 is a showing of the base and carriage of the system of FIG. 1 to a larger scale, with the movable carriage spaced back from the transducer, and the part holding clamp in one of its two alternative orientations.

Now, the guide plate 70 has a main horizontal recess or track 76, a small vertically extending recess 78 and two more extensive vertically extending slots 80 and 82. In the showing of FIG. 7, the bearing member 72 is located in the recess 78, and the part mounting assembly 22 is raised up and moved to the right, to give full access to the central portion of the stand, and to the part holding mechanism 22.

Figure 8:
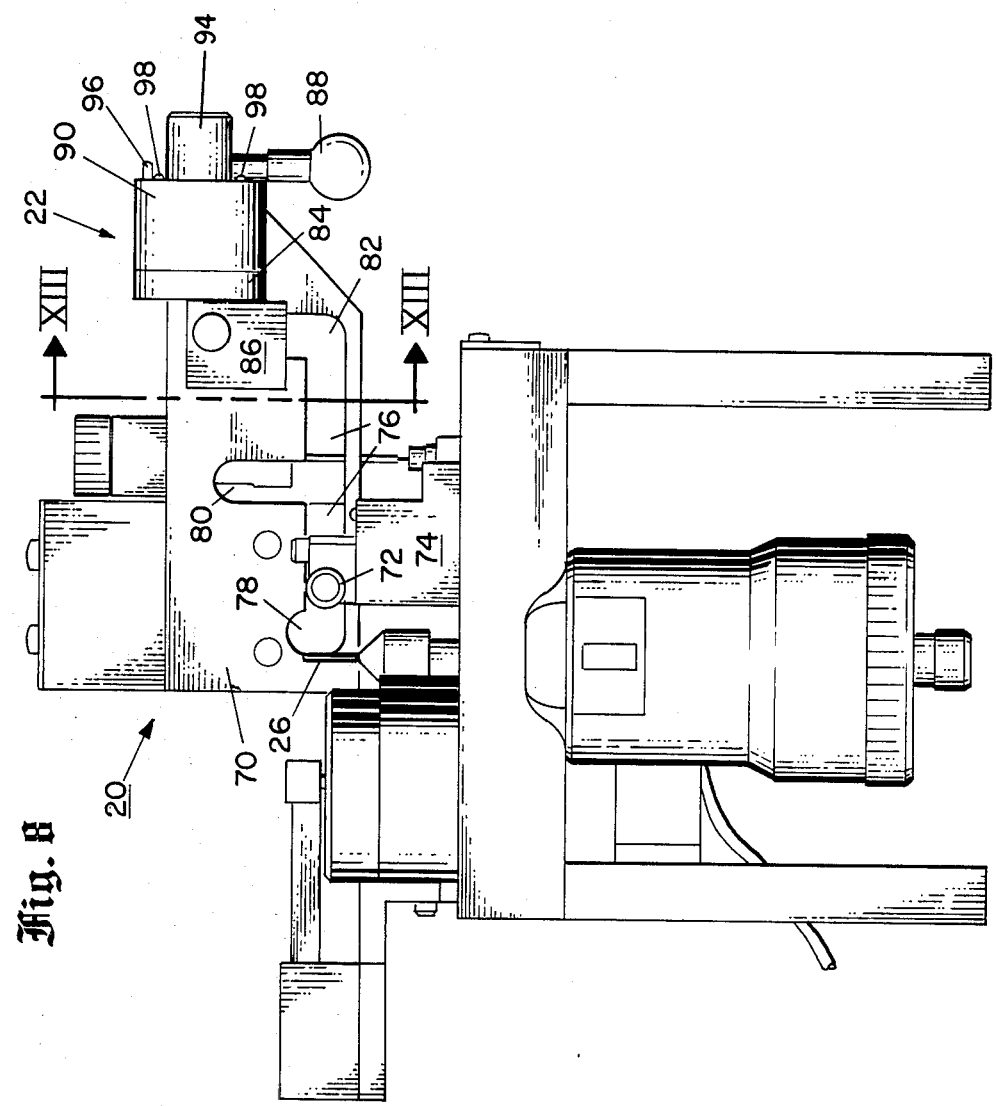
FIG. 8 is a view similar to that of FIG. 7 but with the carriage raised and shifted slightly to the left as compared with the showing of FIG. 7, and with the part clamping head rotated by 180 degrees relative to its orientation in FIG. 7.

Reference will now be made to FIG. 8, which shows the carriage 20 moved slightly to the left, as compared with the showing of FIG. 7. Thus, the bearing member 72 is now riding in the horizontal slot 76, with the movable carriage 20 having been raised up out of the recess 78. In addition, the part mounting bracket 22 has had its movable portion 84 together with the rectangular block 86, rotated by 180 degrees, through the use of the handle 88. Incidentally, the cylindrical portion 90 of the part holding fixture 22 is rigidly secured by bracket 92 (see FIG. 9) to the guide plate 70. The central cylinder 94, the handle 88, the cylindrical member 84, and the rectangular part holding block 86 are all secured to rotate together as the handle 88 is turned. Stops 96 and spring biased detents 98, are provided to hold the block 86 either in one orientation or in an orientation 180 degrees displaced therefrom.

Figure 13:
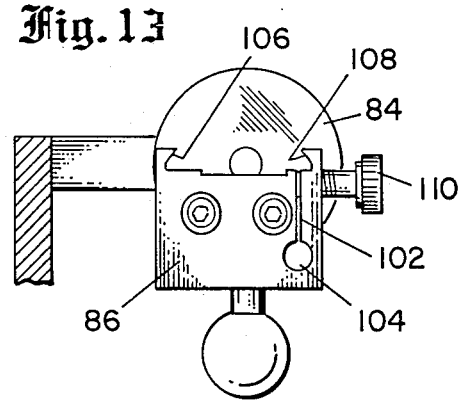
FIG. 13 is a view of the part clamping fixture taken along lines XIII—XIII of FIG. 8.

The mode of securing the brush holding fixtures of FIGS. 2 and 3, and the gage member of FIG. 4 into the block 86 is best shown in FIG. 13, taken along lines XIII—XIII of FIG. 8. More specifically, the block 86 is provided with a saw cut 102 leading to a drilled hole 104. The magnetic brush mounting members, or the gage member, of FIGS. 2, 3 and 4, are inserted into the recess provided by the inwardly turned members 106 and 108. Then the screw 110 is tightened, forcing the surface 108 inwardly, as permitted by the flexibility provided by the saw cut 102, to firmly hold the brushes or the gaging fixture in place. It may be noted that the brush assemblies will be mounted with their axes aligned with the center of rotation of the members 94, 84, and 86, so that accurate measurements may be made relative to the brushes 38 and 40 of FIG. 2, with the fixture in one orientation; and of the brushes 42 and 43 when the fixture is turned 180 degrees as a result of rotation by the handle 88.

Figure 10:
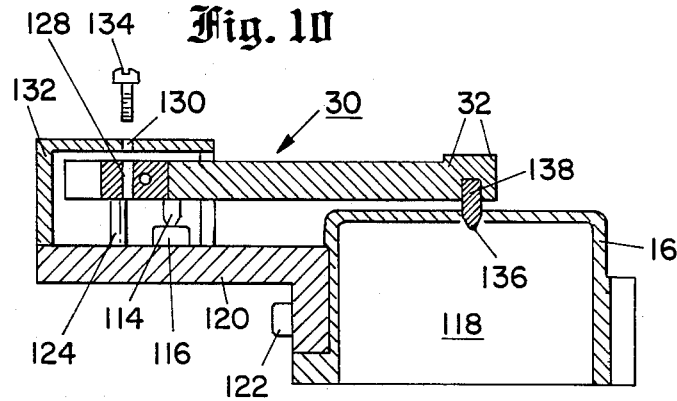
FIG. 10 is a cross-sectional view of the force transmitting arm and associated mounting assembly.
Figure 11:
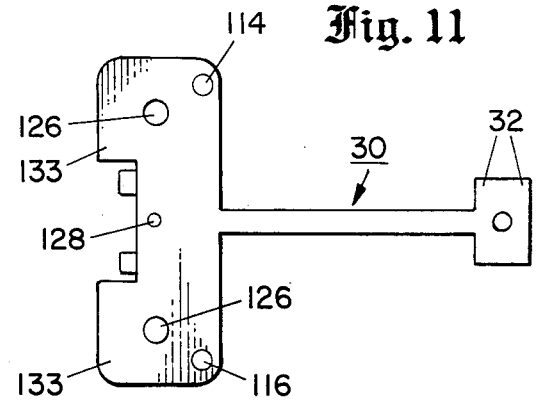
FIG. 11 is a top view of the force transmitting arm.

With reference to FIG. 10 the arrangements for mounting the force transmitting arm 30, with its end 32 overlying the capacitive pressure or force transducer, is shown in greater detail. More specifically, the arm 30 is mounted on two pointed pins 114 which seat in conical recesses in the members 116. The capacitive pressure or force transducer will be located within the space 118 within the machined aluminum housing 16. A bracket 120 is secured by a pair of bolts 122 to the housing 16. Pins 124 extend upwardly from the bracket 120 to which they are rigidly secured, and passed through the openings 126 in the arm assembly 30, with relatively small clearance. The tapped hole 128 in arm 30 is located directly below the opening 130 in the housing 132, so that, using a small machine screw 134, the arm 30 may be secured spaced upwardly away from its pivot points and away from the pressure transducer, thereby avoiding possible damage to the capacitive transducer or to the fine pivot points, when the system is not in use. Incidentally, the lower end 136 of the screw 138 is provided with a suitable radius, and it has been determined that a radius of approximately 3/32nds of an inch is appropriate to apply suitable pressure to the upper diaphragm 60, as shown in FIG. 5, without piercing it. It may also be noted that the arm 30 has enlarged portions 133 extending in the opposite direction from the pivot pins 114 as compared with the arm 30, so that minimal force is normally applied by the rounded end 136 to the diaphragm.

Figure 9:
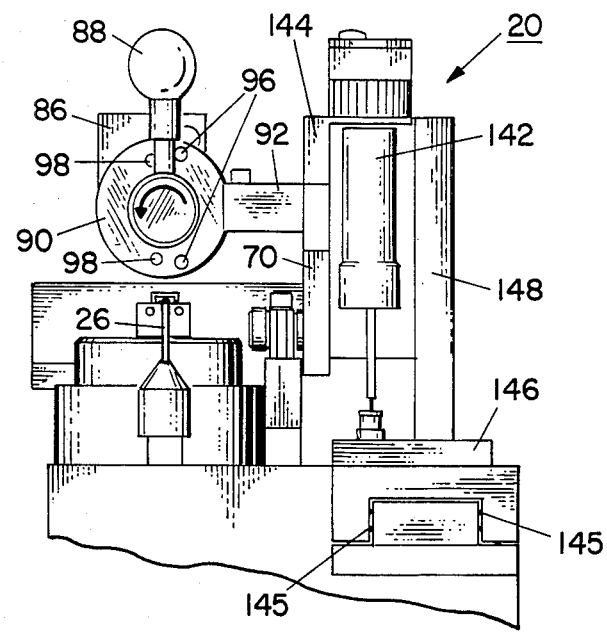
FIG. 9 is an end view from the right-hand end of the apparatus showing the upper part thereof.

Concerning another aspect of the construction, when the carriage 20 is dropping down under its own weight in one of the locations permitted by the slots 80 and 82, it is desirable that its speed of descent be regulated in order to avoid damaging the transducer diaphragm; and this is accomplished by means of the dashpot 142 which is secured to the guide plate 70 by the bracket 144 and moves with it. Also shown in FIG. 9 are the tracks 145 supporting the horizontally movable portions 146 and 148 of the carriage 20.

Figure 6:
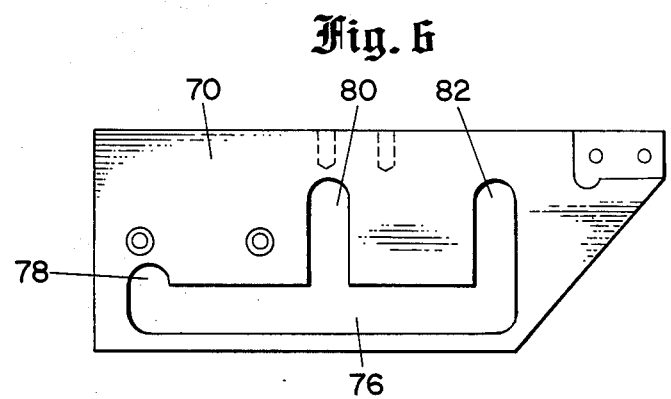
FIG. 6 is a separate showing of the guide plate which controls the movement in both the horizontal and vertical directions of the carriage of the device of FIG. 1, relative to the base thereof.
Figure 14:
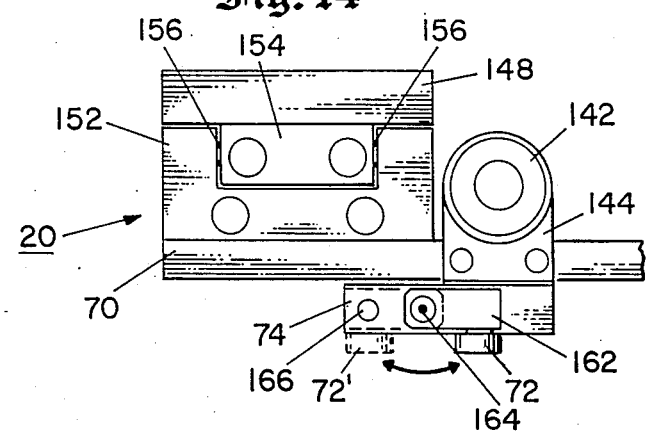
FIG. 14 is a top view of a portion of the carriage showing how it interfits with the base, and showing the vertically extending track for the carriage.

While consideration is being given to the movement of the carriage 20, attention is directed to FIG. 14 of the drawings, which is a top view of the vertically extending member 148, which has limited horizontal movement as described in the preceding paragraph. The vertically movable portion of the assembly includes the U-shaped member 152 which is mounted for vertical movement relative to member 48 and strip 154 secured thereto, by the tracks 156. The guide plate 70 is, of course, secured to the U-shaped member 152, and thus is capable of both vertical and horizontal movement, with this vertical and horizontal movement being controlled by the slot configuration as shown in FIG. 6.

Now, still referring to FIG. 14, the bearing member 72 may be shifted in position by rotation of the supporting member 162 about the axis 164. There are actually two bearing members 72 and 72', extending in opposite directions from the pivoted member 162. In the solid line orientation of FIG. 14, the bearing member 72' is not observable, as it is within a recess in the member 70. Alternatively, considering the dashed line showing of FIG. 14, the bearing member 72 is within a slot of the guide plate 70, and the coaxial bearing member 72' on the other side of the rotatable mounting member 162, may be observed. The spring-biased detent 166, and a mating detent on the other side of the axis 164, in the mounting block 74, serve to hold the pivotable bearing support member 162 in the desired orientation. By shifting the member 162 by 180 degrees, the relationship of the bearing point 72 or 72' relative to the vertically extending slots 78, 80 and 82, is shifted, so that a magnetic brush or magnetic head assembly of the type shown in FIG. 3 may be tested with one orientation of member 162, while other brushes of the type shown in FIG. 2 may be tested when the position of bearing mounting member 162 is reversed.

Figure 12:
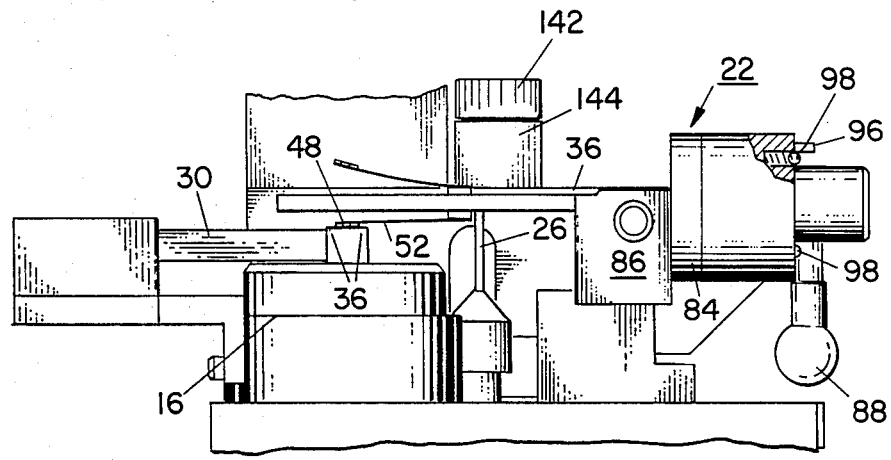
FIG. 12 shows the position of certain key elements of the assembly when a measurement is actually being made.

Turning now to FIG. 12, this drawing shows the test apparatus in use, testing the force applied by the spring 52 to the magnetic head 48 which is bearing on the end 32 of the force transmitting arm 30. Incidentally, the micrometer plunger or probe 26 is bearing on and is supporting the shank of the magnetic brush assembly 36 so as to obtain an accurate amount of deflection of the spring 52, to thereby test the brush assembly under standardized spacing conditions. Now, to review the steps involved in making a force measurement test, the first step would be to insert a test or gage member such as that shown at 54 in FIG. 4 of the drawings into the rectangular clamping fixture 22, and move it to the left in FIG. 7 so that one of the studs 56 is resting on the outer end 32 of the arm 30, and the other stud 58 is underlying the end 26 of the micrometer probe. The micrometer probe 26 is then advanced until the stud 56 barely engages the end 32 of the arm 30, and no force reading appears on the indicator 68. This provides a reference level for the end of the micrometer probe 26 and the micrometer reading may be reset to zero. A brush such as the brush assembly 34 or 36 shown in FIGS. 2 and 3 of the drawings is then clamped in the fixture 22 and moved into position with the brush engaging the outer ends 32 of the arm 30 as shown in FIG. 12. The end 26 of the micrometer probe is then raised by a predetermined distance so that the spring 52 supporting the head 58, shown in FIG. 12, is compressed by a predetermined distance, with the carriage and the base of the spring assembly being supported by the micrometer plunger. The amount of force applied by the spring 52 to the head 48 may then be read from the readout device 68 as shown in FIG. 1.

In passing, it may be noted that the force transmitting member 30 is useful in eliminating the errors in output force readings which may be introduced by the "footprint" or configuration of a part being measured which directly engages the diaphragm 60 of FIG. 5. When a force measurement involves direct engagement of the diaphragm by the part being measured, it has been found that there may be errors in the indicated force resulting from the changes in diaphragm deflection resulting from off-center or unbalanced application of pressure. The use of the rounded ball configuration 136 at the lower end of the screw 138 at the end 32 of arm 30, standardizes the application of force to the transducer, and avoids the problems mentioned above.

In conclusion, it is to be understood that the specific illustrative embodiment described hereinabove and shown in the drawings is illustrative of the principles of the invention. Variations may be made in the implementation of the invention, for example, by using a different type of pressure or force responsive transducer, through the use of alternative guiding arrangements, or alternative mechanical mechanisms to substitute for the detents, clamps and similar mechanisms which are known per se. Special mechanisms may also be provided for clamping a part to be tested to deflect it by a predetermined amount, when the weight of the carriage is insufficient to accomplish this function. It is also to be understood that the disclosed arrangements are clearly applicable to the measurement of other types of parts, in addition to spring mounted magnetic heads. Accordingly, the present invention is not limited to that precisely as shown and described hereinabove.

What is claimed is:

1. An apparatus for determining the force resulting from a predetermined deflection comprising:
    a capacitive type pressure or force transducer having two spaced insulating plates including one of said plates being a flexible diaphragm, and opposed conductive material on said plates, having a capacitance which varies as said diaphragm is deflected;
    a standardized pivoted force transmitting arm having one end engaging the center of said diaphragm;
    movable carriage means for holding a pair to be tested under predetermined levels of deflection;
    means for mounting a part to be measured securely on said carriage;
    means for guiding one portion of said part into engagement with the end of said arm overlying the center of said diaphragm;
    means for providing a controlled amount of deflection of said part as it engages said arm; and
    whereby the force applied to said diaphragm may be determined from the output of said transducer.

2. An apparatus as defined in claim 1 wherein said guiding means includes means for controlling the movement of said carriage between an advanced measuring position and a retracted loading position.

3. An apparatus as defined in claim 2 wherein the apparatus includes a base upon which said transducer and carriage are mounted, and said guiding means includes a plate having slots therein, and a mating bearing member for fitting into said slots, and means for mounting one of said bearing or said plate on said carriage and the other onto said base.

4. An apparatus as defined in claim 1 wherein said means for providing a controlled amount of deflection includes a micrometer, with an upwardly extending probe for engaging the part to be measured or the carriage.

5. An apparatus as defined in claim 1 including dashpot means for retarding rapid movement of said carriage which might otherwise damage said transducer.

6. An apparatus as defined in claim 1 further comprising means for displaying a numerical indication of the transducer output.

7. An apparatus as defined in claim 1 wherein means are provided for counterbalancing said force transmitting arm to reduce the force normally applied to said transducer to a minimal level.

8. An apparatus as defined in claim 1 wherein said mounting means includes means for shifting the position of said part to be measured on said carriage.

9. An apparatus as defined in claim 8 including means for rotating said part by substantially one hundred and eighty degrees.

10. A force measuring apparatus for measuring the deflection force of spring-mounted magnetic heads, or similar part comprising:
    a base;
    a force or pressure transducer mounted on said base and having a predetermined axis along which force is preferably applied thereto;
    movable carriage means for holding a part to be tested under predetermined levels of deflection;
    means for mounting an elongaged flexible part securely on said carriage with the part extending substantially perpendicular to said predetermined axis;
    means for guiding one portion of said part into a deflection measuring position in force-transmitting coupling with said transducer along said predetermined axis, and for shifting said part between said deflection measuring position and a loading position wherein said part is spaced laterally away from said axis;
    means for providing a controlled amount of deflection of said part as it applies force to said transducer; and
    means for determining the force applied to said transducer from the output from said transducer.

11. An apparatus as defined in claim 10 wherein said guiding means includes a plate having slots therein, and a mating bearing member for fitting into said slots, and means for mounting one of said bearing or said plate on said carriage and the other onto said base.

12. An apparatus as defined in claim 10 wherein said means for providing a controlled amount of deflection includes a micrometer, with an upwardly extending probe for engaging the part to be measured or the carriage.

13. An apparatus as defined in claim 10 including dashpot means for retarding rapid movement of said carriage which could otherwise damage said transducer.

14. An apparatus as defined in claim 10 further comprising means for displaying a numerical indication of the measured force.

15. An apparatus as defined in claim 10 wherein said mounting means includes means for shifting the position of said part to be measured on said carriage.

16. An apparatus as defined in claim 15 including means for rotating said part by substantially one hundred and eighty degrees.

17. A force measuring apparatus comprising:
    a capacitive type pressure or force transducer having two spaced insulating plates including one of said plates being a flexible diaphragm, and opposed conductive material on said plates, having a capacitance which varies as said diaphragm is deflected;

movable carriage means for holding a part to be tested under predetermined levels of deflection;

means for mounting a part securely on said carriage;

means for guiding one portion of said part into force transmitting coupling to said transducer; and means for determining the force applied to said diaphragm from the output of said transducer.

18. An apparatus as defined in claim 17 wherein said apparatus includes a base upon which said transducer and carriage are mounted, and said guiding means includes a plate having slots therein, and a mating bearing member for fitting into said slots, and means for mounting one of said bearing or said plate on said carriage and the other onto said base.

19. A force measuring apparatus comprising:

a capacitive type pressure or force transducer having two spaced insulating plates including one of said plates being a flexible diaphragm, and opposed conductive material on said plates, having a capacitance which varies as said diaphragm is deflected;

movable carriage means for holding a part to be tested under predetermined levels of deflection;

means for mounting a part securely on said carriage;

means for guiding one portion of said part into force transmitting coupling to said transducer;

said apparatus including a rounded mechanical force transmitting member engaging substantially the center of said diaphragm; and means for determining the force applied to said diaphragm from the output of said transducer.

* * * * *